United States Patent [19]

Nine

[11] Patent Number: 4,579,497

[45] Date of Patent: Apr. 1, 1986

[54] STOWABLE ROUND BALE HAULER

[76] Inventor: David Nine, Rte. 1, Laverne, Okla. 73848

[21] Appl. No.: 584,603

[22] Filed: Feb. 29, 1984

[51] Int. Cl.⁴ .......................... A01D 90/00; B60P 1/48
[52] U.S. Cl. ................................... 414/24.5; 293/117; 414/24.6; 414/558
[58] Field of Search ...................... 414/24.5, 24.6, 555, 414/558, 911, 665, 669; 293/116, 117

[56] References Cited

U.S. PATENT DOCUMENTS

| | | | |
|---|---|---|---|
| 4,008,862 | 2/1977 | Wilmes | 414/24.6 X |
| 4,082,192 | 4/1978 | Cox | 414/24.6 |
| 4,090,624 | 5/1978 | Krein et al. | 414/24.6 |
| 4,159,833 | 7/1979 | Meiners | 293/117 X |
| 4,298,301 | 11/1981 | Carter et al. | 414/24.6 |
| 4,349,305 | 9/1982 | Wynn et al. | 414/669 X |
| 4,412,768 | 11/1983 | Bauer et al. | 414/24.5 |

Primary Examiner—Robert J. Spar
Assistant Examiner—Janice Krizek
Attorney, Agent, or Firm—Wendell Coffee; Montgomery W. Smith

[57] ABSTRACT

A truck has a stowable round bale hauler that includes a beam hinged to the truck rear, and rotated about a horizontal base axis with hydraulic cylinders. Arms journaled at their ends to the beam are pivoted by hydraulic cylinders connecting the arms and the beam. The arms may be pivoted to and from a folded position, and the beam rotated to and from a stowed position, in which positions the arms and beam are contiguous with the vehicle rear. The arms are meshed when folded, with one arm adjacent and between the other arm and the beam to form a substantially flat vehicle rear. Pointed bale stabbers on the arms are proximate the base axis with the arms folded. The arms may be pivoted from the folded position to an open position, where the bale stabbers are distal of the base axis and separated more than a bale length. The arms are pivotable toward each other to an engaged position where the stabbers impale a bale positioned between the arms. Once a bale is impaled by the stabbers, the beam is rotated about the base axis to load and unload bales on a cargo bed of the truck.

2 Claims, 14 Drawing Figures

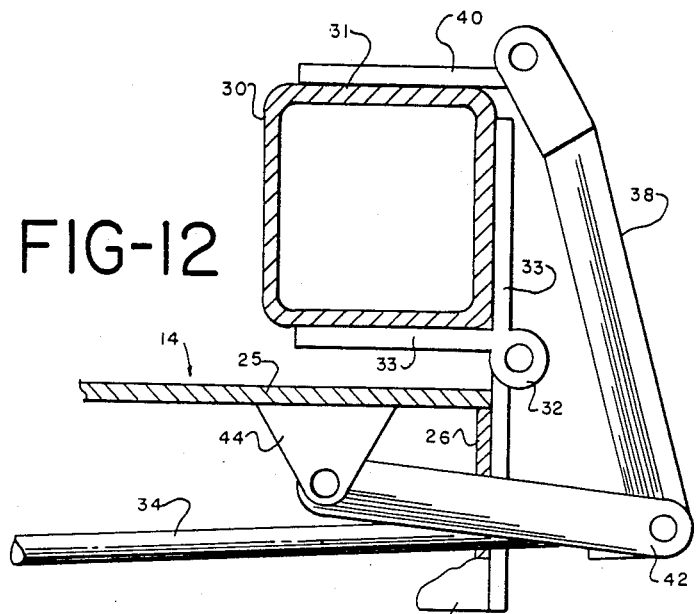
FIG-12
FIG-14
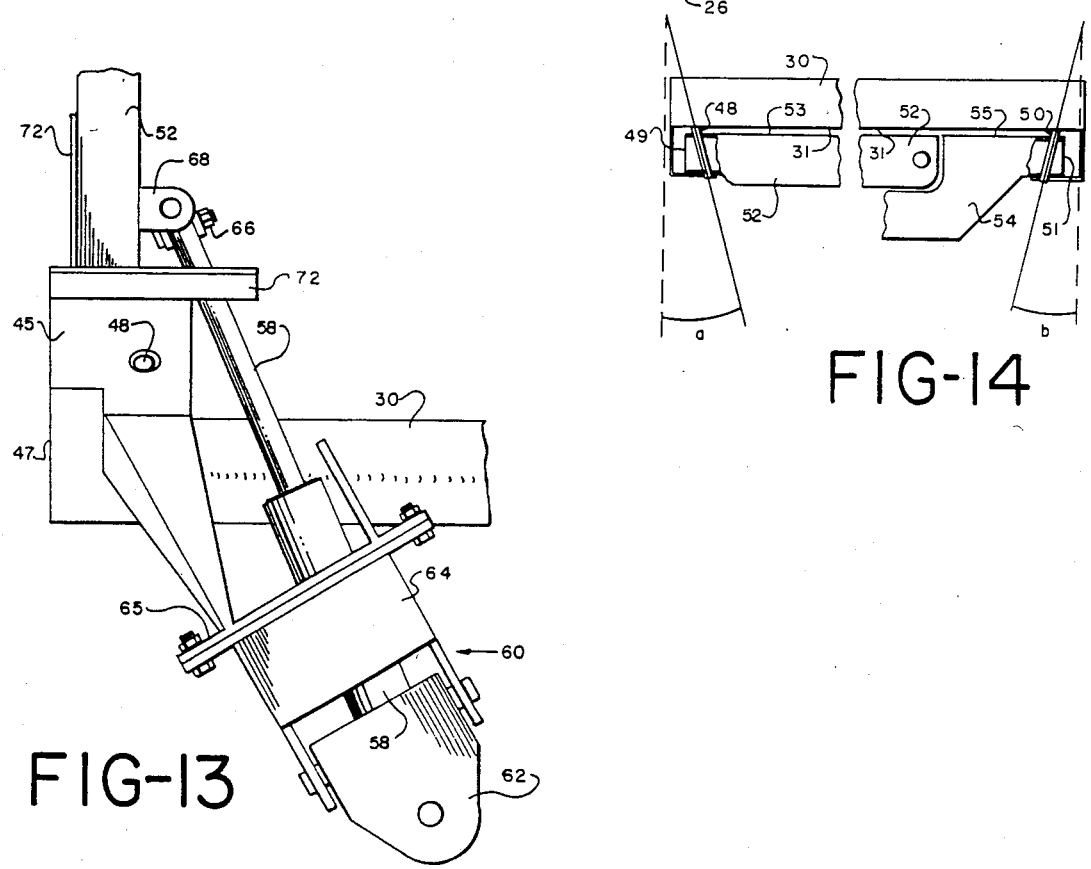
FIG-13

STOWABLE ROUND BALE HAULER

BACKGROUND OF THE INVENTION (1) Field of the Invention

This invention relates to handling large hay bales.

(2) Description of the Prior Art

Large round hay bales are somewhat cylindrical in shape and usually have a diameter of from four to six feet and a length of about four to five feet. Obviously, such a large quantity of hay is extremely heavy and difficult to handle manually.

Devices for hauling such large hay bales were known and used before my invention. Such devices have included power machinery mounted on vehicles. The power machinery was used to load and unload the bales on to and off of the vehicle. The vehicles moved loaded bales to desired locations.

Prior to filing this application, a search was conducted in the U.S. Patent and Trademark Office. That search developed the following U.S. Patents:

| DUCONDU | 1,630,473 |
| ROBINSON | 3,369,678 |
| PETTIT | 3,737,055 |
| HOSTETLER | 4,044,963 |
| VINCENT | 4,062,461 |
| COX | 4,082,192 |

These patents are considered pertinent because the applicant believes the Examiner would consider anything developed by an experienced searcher to be relevant and pertinent to the Examination of this application.

Although the Cox and Hostetler patents are not particularly pertinent to my invention, they are illustrative of prior art hay haulers. The Cox and Hostetler devices both incorporate two opposed, spaced apart arms with inwardly extending stabbers on the ends of the arms. In Cox, the stabbers are impaled by tilting stabbers pivoted to rigidly connected arms into the bale with upward motion of the arms. In Hostetler, the arms are rigidly attached to sliding sleeves telescoped into a supporting tube pivoted to a frame in the pickup bed. The arms are telescoped into the supporting tube to impale the stabbers in the bale. In both devices, hydraulic cylinders on a frame mounted on the bed of a pickup pivot the arms about a horizontal axis up toward the pickup bed. As disclosed by Cox (FIG. 14), if the stabber pins are somewhat coaxial, the bale may be unrolled using the motion of the vehicle.

Although the Cox and Hostetler devices represent significant contributions to the art, they have the disadvantage that they occupy the bed of the pickup, making it unavailable for other uses. The hay hauling device must be removed from the pickup or vehicle before the bed can be effectively used for other purposes.

SUMMARY OF THE INVENTION (1) New Functions and Surprising Results

My invention solves these problems by providing hay handling arms on a vehicle that are foldable into the vehicle rear, thereby freeing the vehicle for other uses. My invention accomplishes the surprising and unexpected results of providing a standard vehicle with a round bale hauler available as needed for hauling hay bales, yet quickly stowable to permit other vehicle uses, with my novel combination of beams, cylinders, pins, arms, etc.

Although my hay hauler could be mounted anywhere on a vehicle, such as being foldable into the vehicle side, I prefer to mount the hay hauler such that it is folded in the rear of the vehicle. My hay hauler rotates the base structure, in the form of a base beam, about a horizontal base axis with a beam cylinder, or lift means, connecting the vehicle and the base beam. Arms are connected at one end to the base beam, and move about the base axis with the beam. The beam preferably has a stowed position where the beam is contiguous with the vehicle rear, and most preferably not extending above the bed level.

The arms also pivot at their connections to the beam about arm axes transverse of the base axis. The arms are pivoted or rotated about the arm axes by pivot means in the form of arm cylinders connecting the base beam and the arms.

When the arms are in a folded position, the arms are meshed, preferably with one arm between the other arm and the beam, and the stabbers and arms are proximate and contiguous with the base axis and the beam. When the base beam is in the stowed position, the folded arms are contiguous with and preferably form part of a flat, solid vehicle rear.

The arms are rotatable or pivotable from the folded position to an open position where the arms are spaced apart and stabbers on the ends of the arms opposite the beam are distal of the base beam.

To load a bale, with the arms in the open position, the stabbers are positioned about axial of a round bale by rotating or pivoting the base beam up or down and backing the vehicle toward the bale. The arms are pivoted from the open position to move the arms and the stabber pins closer together to the engaged position, where the stabber pins are impaled in the bale and substantially coaxial. The beam cylinder is then operated to rotate the base beam, arms and bale about the horizontal base axis from the ground to the bed.

The bale is transported to a desired delivery location, and the loading steps reversed to unload the bale. The bale handler structure is then conveniently stowed in the vehicle rear by rotating the beam rearward to the stowed position, and folding the arms.

When in the folded position, the arms are meshed as described above, and the stabbers are not equidistant from the beam or the ground. However, when unfolded in the open position, arms and stabbers are opposed, forming a throat for a bale, with the stabbers substantially equidistant from the beam and the ground. This is accomplished by orienting the pivot pins to which the arms are journaled at different angles with respect to the base axis and beam.

Thus it may be seen that the function of the total combination far exceeds the sum of the functions of the individual elements, such as arms, beams, cylinders, stabbers, etc.

(2) Objects of this Invention

An object of this invention is to load, transport, and unload round hay bales.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawings, the different views of which are not scale drawings.

BRIEF DESCRIPTION OF THE DRAWING

FIG. 12 is a sectional view taken substantially along line 12—12 of FIG. 11, showing the connections of the beam cylinder to the base beam.

FIG. 13 is a detailed elevational view of one of the arm cylinders and its connections to the arm and the base beam.

FIG. 14 is a schematic diagram of the angles of the arm axes looking toward the vehicle rear, with the arms and base beam in the position shown in FIG. 1.

DESCRIPTION OF THE PREFERRED EMBODIMENT(S)

Figure 1:
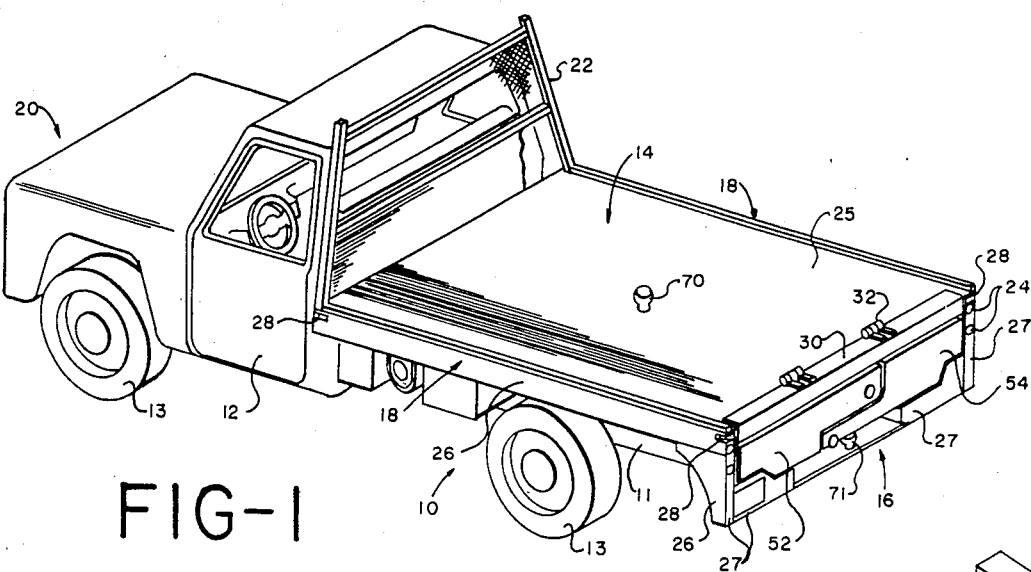
FIG. 1 is a perspective view of a hay hauler pickup according to my invention with the base beam stowed and the arms folded.

My hay hauler is integral with a vehicle in the form of truck 10. The truck 10 includes cab 12 with a chassis 11 and wheels 13, and bed 14. The planar, rectangular surfaced cargo bed 14 extends forward from rear 16 between sides 18 to cab 12. The cab 12 has a front 20, which is also the vehicle front, forward of the rear 16.

The bed 14 includes bed surface 25 preferably in the form of steel plate, supported, and connected to the chassis 11, by bed frame 26. Rack 22 is attached to the bed frame 26 at a front of the cargo bed 14 immediately behind the cab 12. Rear bed frame 27 is part of the bed frame 26 and extends across the rear 16. Taillights 24 are mounted in the rear 16 on the bed frame 27. Running lights 28 are mounted just below the bed 14 at the four corners of the bed frame 26.

Although the vehicle described herein in connection with my invention is a truck having a flat bed 14 thereon, it will be understood that my invention could be employed advantageously with other vehicles, such as trailers, pickups, larger trucks, and the like. The exemplary pickup truck 10 shown in the figures is a type frequently used in livestock feeding operations.

Figure 2:
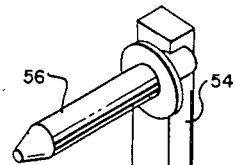
FIG. 2 is a perspective view of the hay hauler with the arms open and raised.

The hay hauler has a base structure, in the form of base beam 30, hinged or pivoted or journaled to the truck 10, with hinges 32. I prefer to use square tubing as the base beam and to weld the hinges 32, with reinforcing straps 33, to a corner of the beam 30 and to the bed frame 26 at the rear 16 near the cargo bed surface 25, as shown in the FIGS. 2 and 12. This placement of the hinges permits movement or rotation of the beam 30 about a substantially horizontal base axis extending through the hinges.

Figure 3:
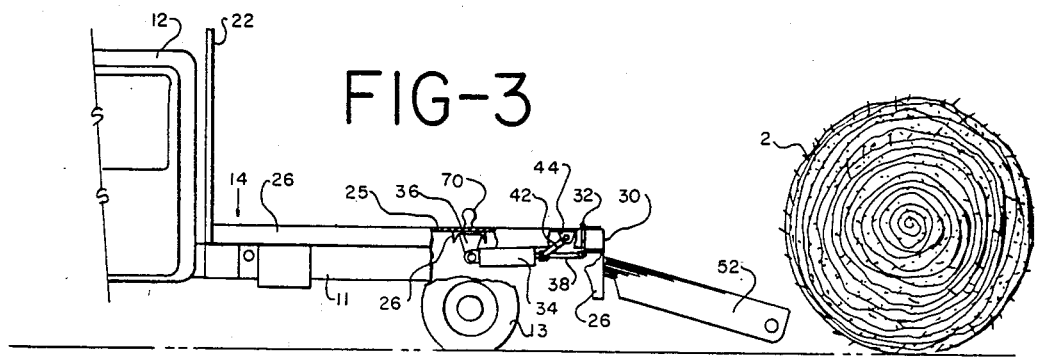
FIG. 3 is a side elevational view of the hay hauler with portions of the truck broken away to show the beam cylinder connections.
Figures 4, 5:
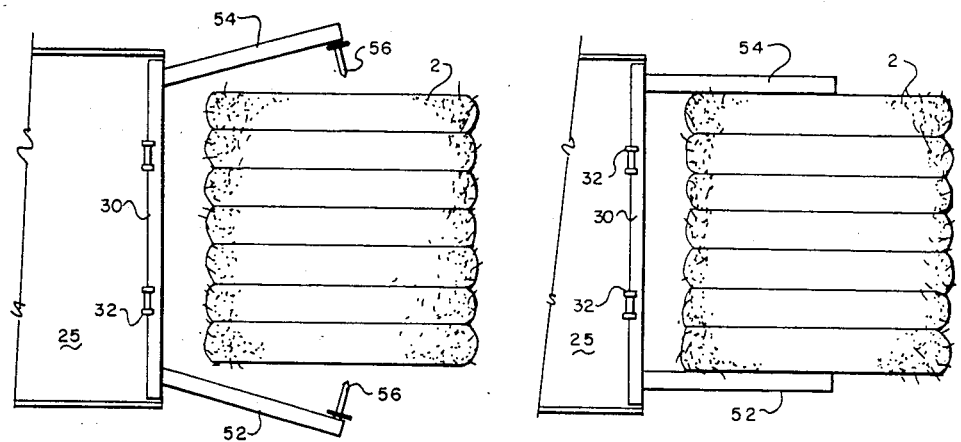
FIG. 4 is a plan view of the hay hauler shown in FIG. 3 with the arms in the open position.
FIG. 5 is a plan view of the hay hauler with the arms in the engaged position.
Figure 6:
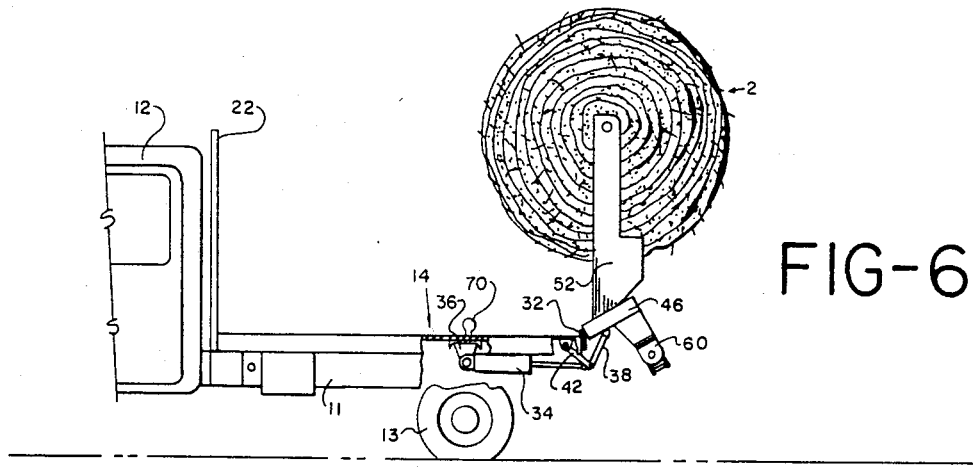
FIG. 6 is a side elevational view with the beam, the arms and a bale rotated upward, with portions of the truck broken away to show the beam cylinder connections.
Figure 7:
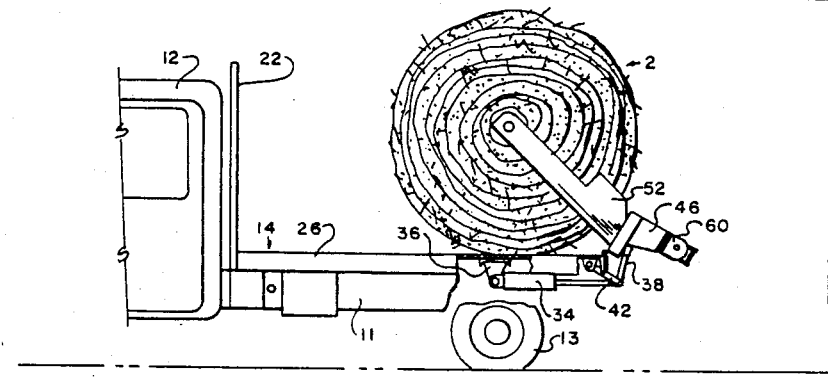
FIG. 7 is a side elevational view with the beam and arms rotated forward to rest the bale on the bed, with portions of the truck broken away to show the beam cylinder connections.
Figure 8:
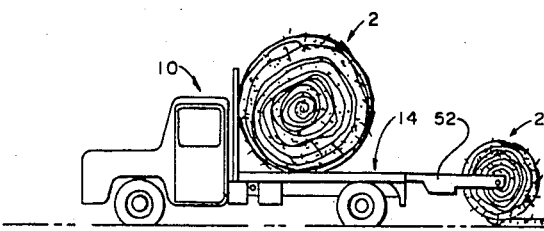
FIG. 8 is an elevational view showing the unrolling of a round bale with the hay hauler.
Figure 9:
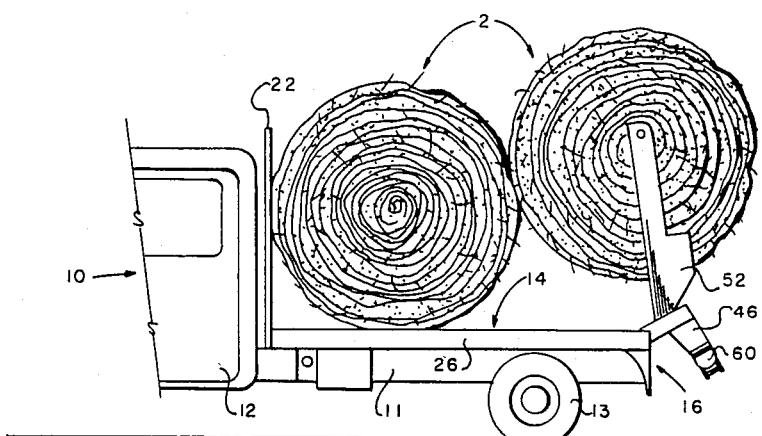
FIG. 9 is a side elevational view showing a bale on the bed and another bale engaged by the stabbers and raised.
Figure 10:
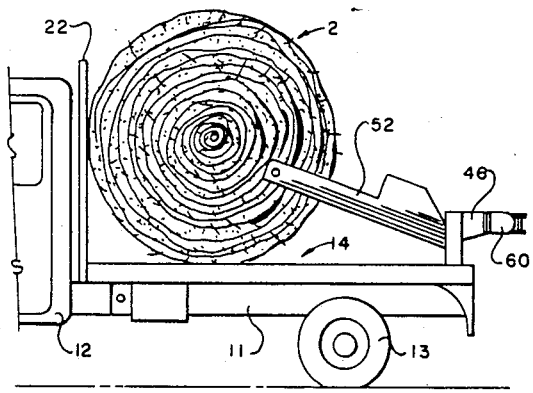
FIG. 10 is a side elevational view showing the arms in open position ready to engage a bale on the truck.
Figure 11:
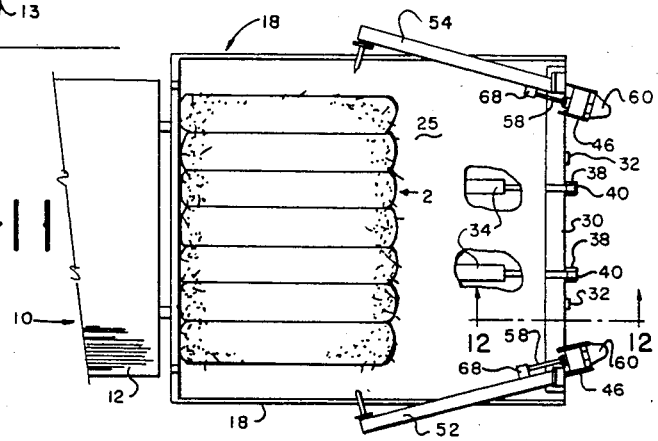
FIG. 11 is a plan view of the hauler as shown in FIG. 10.

Lift means for moving or rotating or pivoting the base structure about the base axis, in the form of two beam cylinders 34, connect the truck 10 and the beam 30. The beam cylinders are connected at one end to the truck 10, preferably pivoted to bed ears 36 attached to the bed frame 26 directly below the bed surface 25 (FIGS. 3, 6, and 7).

I prefer to mount the beam cylinders and the beam to the bed frame 26 instead of the chassis 11 so that the hay hauler may be sold as a unit integral with the complete bed 14 for convenient installation on any desired standard pickup truck chassis, behind the cab. Of course, it will be understood that the base structure and lift means could be attached to the pickup chassis or other structure of the vehicle as desired, and still be within the scope of my invention.

The preferred connection of the two beam cylinders 34 to the beam 30 is by beam links 38. Each beam link is journaled at one end to beam ears 40 on the beam 30, and journaled at the other end to one of the beam cylinders 34.

Bed links 42 are preferably journaled at one end to bed link ears 44, preferably attached to the bed frame 26 forward of the rear 16 and hinges 32, and below the bed surface 25. The other end of the bed links 42 are journaled to the beam links 38, preferably at the points at which the beam links are journaled to the beam cylinders.

The bed links 42, beam links 38 and beam cylinders 34 in combination provide the lift means connecting the vehicle and the base structure for moving the base structure, or beam 30, about the base axis. Of course, other levers or motors and linkages could be devised and still be within the scope of my invention, so long as they provide for movement of the base structure about the base axis.

The beam 30 is rotatable or pivotable to a stowed position, where the beam is substantially contiguous with the vehicle rear 16. When in the stowed position, the beam is also preferably substantially below the level of the bed surface 25, and part of a substantially flat vehicle rear (FIG. 1).

Pin brackets 46 are attached to and extend from each end of the beam 30. Arm pins 48 and 50 are preferably connected or attached at a slightly nonnormal angle to one side of the beam 30, and at each end of the beam 30, between the beam 30 and the brackets 46. The pin brackets 46 include among other members bracket struts 47 and pin plates 45. The struts 47 extend from each end of the beam 30 normal to the side to which the pins 48 and 50 are attached. The pin plates 45 are attached to the ends of the struts 47 and extend toward the vehicle center, parallel to the side of the beam 30 to which the pins 48 and 50 are attached. The pin brackets 46 form a convenient, rigid connection point at the pin plate 45 for the arm pins 48 and 50 that are spaced away from the beam 30. Arm axes extend through the arm pins 48 and 50, transverse of the base axis. Safety guards 74 are welded to the bracket struts to prevent persons from placing a hand or foot between the struts and rear bed frame 27 as the beam is rotated downward.

Upper arm 52 and lower arm 54 are journaled to the beam 30 at the arm pins 48 and 50, respectively, for rotation, pivoting, or movement about the arm axes extending through the arm pins.

Stabbers 56 are connected to ends of the arms 52 and 54 opposite the arm pins 48 and 50. The stabbers 56 are elongated pins somewhat sharpened or pointed on one end, preferably rotatably attached, or journaled, to the arms at their free end. I prefer to journal the stabbers 56 to the arms to permit their rotation while loading and unloading, and when unrolling, a bale of hay, to be described later. However, the stabbers 56 may be rigidly attached to the arms 52 and 54 and in a length or shape different from that shown, if desired, so long as the stabbers will engage or impale a bale when the arms are pivoted toward each other with the bale between the stabbers.

Arm pivot means in the form of arm cylinders 58 are connected to the beam 30 and the arms 52 and 54 for moving the arms about their respective axes. The arm cylinders 58 are connected to the beam 30 by cylinder brackets 60, preferably bolted to and disconnectable from the pin brackets 46. One end of each arm cylinder 58 is journaled to one of the cylinder brackets 60. Each cylinder bracket 60 includes cylinder piece 62 journaled to the cylinder. The cylinder bracket 60 also includes brace piece 64 bolted to flange 65 of the pin bracket 46. The cylinder piece 62 is journaled to the brace piece 64. The axes of the joints between the cylinder, cylinder piece and brace piece are normal to each other, forming somewhat of a universal joint. Thus, the arm cylinders 58 are free to adjust to changes in angle caused by pivoting of the arms 52 and 54.

The ends of the arm cylinders opposite the cylinder brackets 60 are preferably connected by double jointed structures in the form of pivot links 66 journaled at one end to the cylinders 58 and at the other ends to arm ears 68 welded on the arms 52 and 54. The axes of the joints at each end of the middle links 46 are normal to each other, forming somewhat of a universal joint and insuring that the cylinders do not bind.

Of course, if desired, a single cylinder could be employed as arm pivot means, and connected to both arms and the beam 30 by brackets and links to pivot the arms as desired, and still be within the scope of my invention. However, the dual cylinder arrangement shown in the drawings is preferred because of increased control flexibility, operational reliability, and structural strength.

The base structure may also be other than a beam, such as two independently pivoting members connected to their own beam cylinder. Each arm 52 and 54 would be connected to its respective independent member, and would be independently pivotable about the base axis. However, for reliability and ease of operation, I prefer to use the beam 30 shown in the drawings for concurrent coordinated rotation of the arms and bale about the base axis during loading.

The arms and beam are foldable and rotatable into the vehicle rear 16, such that when the arms are in the folded position and the beam is in the stowed position, the arms are adjacent the base axis and the beam 30, and the arms and beam are contiguous with the rear 16. Although many arm positions within the scope of my invention are possible to satisfy the requirements set forth above, such as folding one arm on top of the other, I prefer to mesh the arms 52 and 54 in the vehicle rear with the preferred arm and beam structure being that detailed below.

The preferred beam 30 is an elongated square tube extending substantially the rear of the vehicle, with the arm pins extending to the pin brackets at somewhat different nonnormal angles to the beam sides.

The preferred upper arm 52 is an elongated rectangular tube member extending below, adjacent and parallel the beam 30 when in the stowed position, journaled at one end to the arm pin 48, and having a forward extending stabber 56 journaled at the other arm 52 end.

The preferred lower arm 54 is preferably made by journaling an elongated rectangular member tube at one end to the arm pin 50, welding another short spacer member below the member journaled to the arm pin 50, and welding still another elongated rectangular tube member to, and below, the spacer member. The third member extends parallel, adjacent and below the straight arm 52, and has the stabber 56 journaled at its end.

With this structure for the arms, and when the beam 30 is in the stowed position and the arms are in the folded position, the stabber end of the arm 54 is offset below the arm 52 to mesh the arms adjacent and contiguous with the beam 30. The arms extend somewhat horizontally above the ground and the stabbers 56 are not equidistant from the base axis, the beam 30, or the ground, but are vertically unaligned. However, when unfolded, with the beam still in the stowed position, the arms are not horizontal, but angle downwardly, with the stabbers near and equidistant from the ground.

This feature of the hay hauler wherein the arms and stabbers are meshed in the folded position, and the stabbers are aligned when the arms are unfolded to the open or engaged positions is accomplished by angling the arm pin 48 differently than the arm pin 50. For convenience, when describing the meshing feature of the arm structure of my invention, as shown in FIG. 14, the beam shall be assumed to be in the stowed position shown in FIG. 1.

The stabber 56 on the arm 52 is closer to the beam 30, and must therefore be moved further downward during pivoting to be aligned with the other stabber 56. Therefore, referring to FIG. 14, when the arms are folded, arm top surfaces 53 and 55 of the arms 52 and 54, respectively, are horizontal. Arm pivot ends 49 and 51 of the arms 52 and 54, respectively, are vertical when the arms are folded, and normal to the top arm surfaces 53 and 55, respectively. However, the arm pins, and the arm axes, are nonnormal to the beam pin side 31, the side of the beam 30 to which the arm pins are connected.

As seen in FIG. 14, the arm axis of the arm 52 when viewed from the vehicle rear, is downwardly angled toward the vehicle center at an angle "a" from normal. Likewise, the arm axis of the arm 54 is downwardly angled toward the vehicle center at an angle "b" from normal. The arm ends 49 and 51 are also at angles "a" and "b" to the arm axes of the arms 52 and 54, respectively.

By selecting the appropriate angles for the arm axes, the stabbers 56 may be offset as desired in the arms' folded position, and aligned when the arms are unfolded or open so that the stabbers are equidistant from the ground, or coaxial.

When the arms are in the folded position, the arms are adjacent, with one arm, being an upper arm, between the beam and the other arm, being a lower arm, and with the stabber on the upper arm being more proximate the beam than the stabber on the lower arm. When the arms are in the open position, the arms are spaced apart and the stabbers are substantially equidistant from the beam and the ground.

Other structures may be devised regarding stowing of the arms and beam and still be within the scope of my invention. For example, the arms may be folded on top of each other, with an appropriate opening in the first folded arm for the stabber of the other arm. This would necessitate no difference in angle of the arm axes for either arm.

As previously described, the rear 16 is preferably flat and solid. The rear bed frame 27 has recesses or openings therein that receive the arms when in the folded position with the beam in the stowed position. The beam and arms are pivoted and journaled to the bed frame 26 and beam 30, respectively, to form a flat back. Filler plates 72 are welded to the arms and the rear bed frame 27 to fill any undesired opening not covered by the main bale handler structure. The only major opening in the otherwise solid rear 16 is the desirable opening for hitch trailer ball 71 attached to the hitch formed by the rear bed frame 27.

Therefore, having described the structure of the hay hauler, the method of operation may be seen to occur as set forth below. With the arms in the stowed position shown in FIG. 1, the truck 10 is used in other operations, including trailer pulling by use of unobstructed bed trailer ball 70 on the bed surface 25, and the hitch trailer ball 71. The bed surface 25 is also left unobstructed for use in hauling materials other than round hay bales while the hay hauler is operatively mounted on the vehicle.

To load round bales, the truck 10 is wheeled to the location of the bale to be hauled, and the arms unfolded from the folded position by extending the arm cylinders 58 to pivot the arms about their respective axes so that the stabber pins are moved away from the base beam and base axis and the arms are moved away from the vehicle rear. The beam is rotated to move the arms to a desired position above the ground prior to loading. The arms are pivoted until they are separated to form a throat for a bale to be loaded.

The extension of the cylinders, and hence the pivoting of the arms, is stopped when the arms are in the open position, where the stabber pins are distal of the beam and base axis and separated more than the length of the bale to be hauled, so that such a bale may be positioned between the stabbers and the arms. The truck is wheeled, or backed, toward the bale and the stabbers are positioned about axial of the bale to be loaded by appropriate adjustment of the positions of the truck rear 16, arms 52 and 54, and the beam 30.

With the bale aligned between the stabbers, the arm cylinders are retracted to pivot the arms about the arm axes, and move the arms and stabbers closer together, thereby impaling or engaging them in the bale. Once impaled or engaged, the stabbers are substantially coaxial, and the arms are in an engaged position. The arm cylinders are stopped, thereby securing the bale between the arms on the stabbers. The beam cylinders are then extended to move the beam and arms up and forward, lifting the bale from the ground.

When the bale is moved above the bed and down onto it, the beam cylinders are stopped. At this point, the truck may be driven or wheeled to the delivery location, or another bale may be loaded. To accomplish the latter, the truck 10 is backed or wheeled toward another bale. The arm cylinders are extended to pivot the arms and stabbers away from each other to the open position, thereby disengaging or removing the stabbers from the bale. When the stabbers are free of the bale, the beam cylinders are retracted to move the arms and beam rearward and downward.

The beam and arms are rotated and pivoted, and the vehicle is wheeled as before, to position the stabbers somewhat coaxial with the bale between the arms and stabbers. The arms are pivoted toward each other by retracting the arm cylinders. The arm cylinders are stopped when the stabbers are fully engaged in the bale, and the beam cylinders are extended to move the arms and the other bale forward and upward. The rotatable stabbers allow the bale to swing as needed, and helps keep the bale intact around the stabbers.

When the other bale contacts the bale already resting on the cargo bed, it will push or roll it to the front of the bed. Once the bale on the bed is so positioned, and the bale between the arms is as far forward as desired, the beam cylinders are stopped, and the truck 10 is wheeled or driven to the delivery location. I find it best to leave the stabbers engaged in the bale, even if only one bale is being transported, to prevent the bale from rolling or shifting around on the bed 14.

At the delivery location, the beam cylinders are retracted to lower the other bale to the ground. If it is desired to unroll the bale, the ties of the bale are cut, and the truck 10 is driven forward, thereby unrolling the bale about its axis. The rotatable stabbers 56 help reduce rolling resistance. The beam cylinders are retracted during the unrolling to rotate the beam rearward and the stabbers downward to account for the decreasing bale diameter.

Alternatively, the bale may be left intact by extending the arm cylinders to disengage the stabbers from the bale. The arm cylinders are stopped when the stabbers and arms are in the open position, free of the bale. The beam cylinders are extended to move the stabbers upward and forward. The beam cylinders are stopped when the stabbers in the open position are satisfactorily positioned about the bale on the cargo bed. The arm cylinders are retracted to pivot the arms closer to the bale, and stopped when the stabbers are fully engaged.

The bale on the bed is then unloaded by retracting the beam cylinders to move the arms and beam rearward. Again, the rotatable stabbers help keep the bale engaged as the bale is dragged on, and then swung away from, the bed 14. The beam cylinders are stopped when the bale is resting on the ground. The bale may be unrolled as described above, or the arm cylinders extended to disengage the stabbers from the bale.

Once the bales are unloaded, or at any other time, the bale handler structure may be stowed. The arms are folded by retracting the arm cylinders to pivot the arms and stabbers toward the base beam and beam axis. The beam cylinders are also retracted to move the beam about the base axis downward to the stowed position, if it is not already there. The arm cylinders are stopped when the stabbers are proximate the base axis and beam, such that the arms are contiguous with the base beam and the vehicle rear.

Of course, a vehicle with a longer bed could be employed, and the loading steps described above repeated to load any desired number of bales onto the cargo bed. Additionally, the vehicle could be wheeled or driven to different locations between both loading and unloading steps as described above.

Thus, the embodiment of the hay hauler of my invention described above provides a novel, hydraulically powered device for easily and efficiently loading, transporting, and unloading round hay bales. The utility of the device is enhanced by integrating the hay hauler with the vehicle so that the device may be conveniently stowed and the vehicle used for other purposes.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

2 bale
10 truck
11 chassis
12 cab
13 wheels
14 cargo bed
16 rear
18 sides
20 front
22 rack
24 taillights
25 bed surface
26 bed frame
27 rear bed frame
28 running lights
30 base beam
31 beam pin side
32 hinges
33 reinforcing straps
34 beam cylinders
36 bed ears
38 beam links
40 beam ears
42 bed links
44 bed link ears
45 pin plate
46 pin brackets
47 bracket strut
48 arm pin
49 arm pivot end
50 arm pin
51 arm pivot end
52 upper arm
53 arm top surface
54 lower arm
55 arm top surface
56 stabbers
58 arm cylinders
60 cylinder brackets
62 cylinder piece
64 brace piece
65 flange
66 pivot links
68 arm ears
70 bed trailer ball
71 hitch trailer ball
72 filler plates
74 guard

I claim as my invention:

1. A vehicle having
   a. a front forward of
   b. a rear,
   c. sides, and
   d. a cargo bed extending forward from the rear between the sides; for hauling
   e. round bales, each having
   f. a length along a bale axis and
   g. a diameter;
wherein an improved round bale hauler comprises in combination with the above vehicle:
   h. a base structure pivoted to the vehicle for movement about a substantially horizontal base axis,
   i. lift means connecting the vehicle and the base structure for moving the base structure about the base axis,
   j. two arms pivoted to the base structure for movement about respective spaced apart arm axes transverse of the base axis,
   k. a bale stabber on each arm,
   l. pivot means connecting the arms and the base structure for moving each arm about its respective arm axis between an open position and a folded position, such that
   m. the stabbers are distal of the base axis and spaced apart more than the length of a bale when the arms are in the open position, and
   n. the stabbers are proximate the base axis and the arms are contiguous with the base structure when the arms are in the folded position,
   o. the base axis being positioned at the vehicle rear,
   p. the base structure having a stowed position where the base structure is substantially contiguous with the vehicle rear, and
   q. the arms being substantially contiguous with the vehicle rear when the base structure is in the stowed position and the arms are in the folded position,
   r. the vehicle rear including a flat, vertical rear frame with recesses therein for the arms and base structure,
   s. the arms being meshed when in the folded position so that when the arms are in the folded position and the base structure is in the stowed position, the base structure, the arms, and the rear frame form a substantially flat vehicle rear.

2. A vehicle having
   a. a front forward of
   b. a rear,
   c. sides, and
   d. a cargo bed with a bed surface extending forward from the rear between the sides; for hauling
   e. round bales, each having
   f. a length along a bale axis and
   g. a diameter;
wherein an improved round bale hauler comprises in combination with the above vehicle:

h. an elongated base beam hinged to the vehicle at the rear for movement about a substantially horizontal base axis,
i. a beam cylinder connecting the vehicle and the beam for moving the beam about the base axis,
j. two arm pins attached to the beam at spaced apart points therealong,
k. the arm pins forming arm axes transverse of the base axis,
l. two arms journaled at ends thereof to the arm pins for movement about the arm axes,
m. a stabber attached to and extending from each arm,
n. at least one arm cylinder connecting the arms and the base beam for pivoting the arms about the arm axes,
o. said arm cylinder providing means for pivoting the arms between an open position and a folded position, such that
p. the stabbers are opposed, distal of the beam, and spaced apart more than the length of a bale when the arms are in the open position, and
q. the stabbers and the arms are proximate and adjacent the beam when the arms are in the folded position
r. the beam having a stowed position where the beam is substantially below the cargo bed surface and contiguous with the vehicle rear,
s. the arms being meshed when in the folded position such that when the beam is in the stowed position and the arms are in the folded position, the arms are contiguous with the vehicle rear,
t. said vehicle rear including a substantially flat, vertical rear frame attached to the vehicle having openings therein for receiving the arms below the beam.

* * * * *